Sept. 20, 1927.　　　O. J. GROEHN　　　1,642,730

AUTOMOBILE BODY

Filed Aug. 15, 1925

INVENTOR
Otto J. Groehn.
By MacLeod, Calvert, Copeland & Dike
ATTORNEYS

Patented Sept. 20, 1927.

1,642,730

UNITED STATES PATENT OFFICE.

OTTO J. GROEHN, OF GROSSE POINTE PARK, MICHIGAN, ASSIGNOR TO HUDSON MOTOR CAR COMPANY, OF DETROIT, MICHIGAN, A CORPORATION OF MICHIGAN.

AUTOMOBILE BODY.

Application filed August 15, 1925. Serial No. 50,405.

This invention relates especially, although not exclusively, to automobile bodies of the general type shown and described in applications for Letters Patent Serial Nos. 42,179 and 42,180, filed July 8, 1925. The invention has for its objects to provide improved means for securing the roof or top frame of a closed automobile body to the tops of the side walls thereof, to provide a simple form of drip gutter, of the character employed at various points adjacent the tops of both open and closed bodies, together with simple but effective means for securing the same in place, and more specifically to provide an improved combined drip gutter and finish strip for the joint between the side walls and top of a closed body comprising a finish strip portion and a gutter portion adapted to be held in assembled relation by interengagement of their respective parts.

The foregoing and other objects of the invention, together with means whereby the latter may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise embodied without departure from its spirit and scope.

Figure 1:
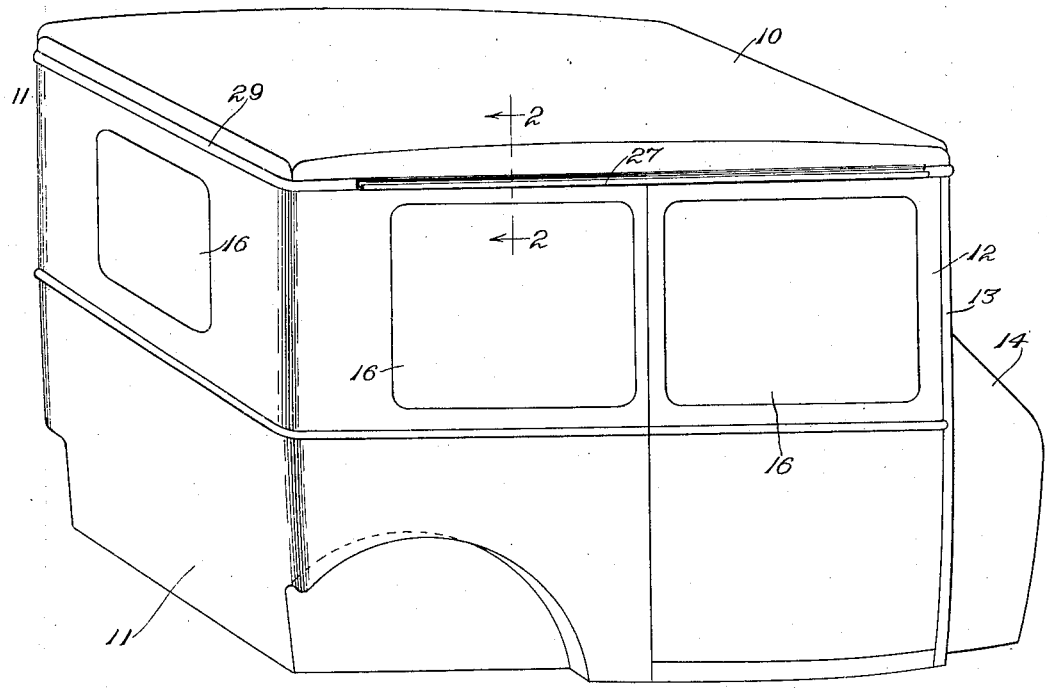
Fig. 1 is a perspective view of an automobile body embodying the invention.
Figure 3:
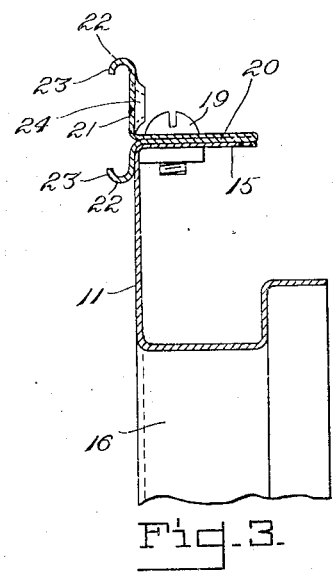
Fig. 3 is a similar view with the top frame and drip gutter omitted.

In Fig. 1 is shown a closed automobile body of the coach type comprising a top 10, side walls 11, doors 12, front frame 13, and cowl 14. In the construction shown, as in the prior applications above referred to, the side walls 11 are composed of sheet metal panels having their adjacent edges secured together, the upper panels having at their upper edges inturned flanges 15 (see Figs. 2 and 3). The panels 11 and doors 12 are provided with suitably disposed and shaped window openings 16. The top 10 comprises a preferably wooden frame 17 over which is stretched a fabric covering 18.

Secured, as by bolts 19, to the top flanges 15 of the panels 11 is a substantially horizontally disposed, combined top-attaching, finish, and gutter-holding strip, preferably comprising a strip of sheet metal folded or bent longitudinally upon itself to form a two-ply horizontal portion or flange 20 to receive the bolts 19 and an outwardly disposed channel portion 21, the flanges 22 of which are turned toward one another, as shown at 23. The web of the channel portion 21 is provided at intervals with openings 24 through which fasteners, such as screws 25, may be inserted into the top frame 17, thereby securing the latter to the side walls of the body. If desired, additional fasteners 26 may be driven into the top frame 17 through other openings in the flanges 15 and 20 between the fasteners 19. Where round headed bolts, such as are shown at 19, are employed, the top frame 17 may be provided with suitable recesses to receive the same, or, if desired, flat headed bolts or rivets of any well-known type may be employed. It will be seen that the strip described serves not only as means whereby the top frame can be conveniently secured in place to the tops of the side walls of the body, but also serves to cover, conceal and finish the joint between said parts together with the edge of the covering fabric 18, while assisting in securing the latter in place.

Figure 2:
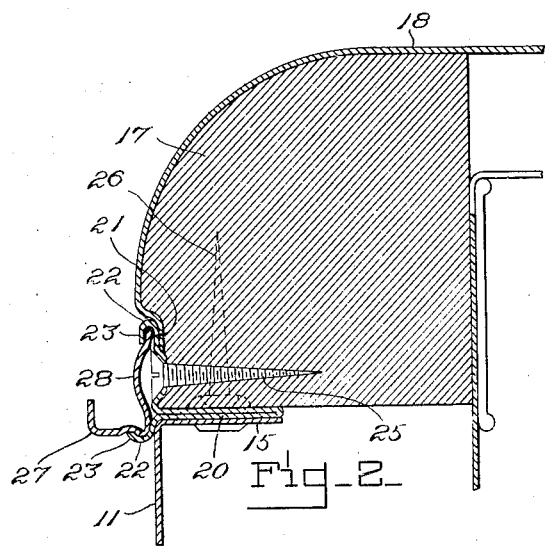
Fig. 2 is an enlarged detail section taken substantially on the line 2—2, Fig. 1.

Associated with the combined top-attaching and finish strip last described along the sides of the body over the side windows 16 is a drip gutter 27 having a substantially vertically disposed web 28 received in the channel portion of the finish strip and secured in place by interengagement of the edges of said web with the turned edges 23 of the flanges 22. Said gutter preferably comprises a strip of sheet metal suitably bent longitudinally to form the web 28 and the desired drip-catching or gutter portion proper, and may conveniently be inserted lengthwise into the channel portion 21 of the finish strip and thereafter retained in place by the interengagement of the parts. If desired, the inturned edge 23 of the upper flange 22 may, after the insertion of the gutter strip, be flattened down slightly, as shown in Fig. 2, to retain said gutter strip more securely in place. The drip gutter is usually employed only at the sides or front or both, depending upon the type of car, and at other points, as indicated at 29 in Fig. 1, the top attaching strip may be formed or provided with a suitable part or portion constituting a mere finishing molding.

Having thus described my invention, I claim:

1. In an automobile body, the combination with a substantially horizontal strip secured to the body adjacent the top thereof, said strip having an outwardly disposed channel portion the outer ends of the flanges of which are turned toward one another, of a drip gutter having a substantially vertical web received in said channel and secured in place by the turned ends of the flanges of the latter.

2. A closed automobile body having side walls, a top superposed on said side walls, a strip positioned at the junction of said walls and top and having a portion extending between the walls and top, means for securing the strip to the side walls, said strip having right angularly disposed sections provided with opposed flanges forming a channel therebetween, means for securing one of said sections to the top, and a drip gutter engaging said channel, said gutter concealing side strip securing means.

3. A closed automobile body having side walls, a top superposed on said side walls, a substantially T-shaped strip positioned at the junction of said walls and top, one portion of the strip extending between the walls and top, means for securing said strip to the side walls, the other portion of said strip being provided with opposed flanges forming a channel therebetween, means for securing said last mentioned strip portion to the top, and a drip gutter engaging said channel and concealing said strip securing means.

4. In a closed automobile body, in combination, side walls, a top frame, and a connecting strip folded longitudinally upon itself to form a two-ply horizontal portion positioned between the side walls and top frame and an outwardly disposed channel portion, said horizontal and said channel portions being secured to the side wall and top frame, respectively.

5. In a closed automobile body, in combination, side walls, a top frame, a connecting strip folded longitudinally upon itself to form a two-ply horizontal portion positioned between the side walls and top frame and an outwardly disposed channel portion, said horizontal and said channel portions being secured to the side wall and top frame, respectively, and a drip gutter carried by said strip.

6. In a closed automobile body, in combination, side panels having inturned flanges at their upper edges, a top frame, and a top-attaching strip having a horizontally disposed portion overlying and secured to the panel flanges and a vertically disposed portion secured to the outer face of said top frame, said last mentioned portion having flanges provided with inturned ends for supporting a drip gutter.

7. In a closed automobile body, in combination, side panels having inturned flanges at their upper edges, a top frame, a top-attaching strip having a horizontally disposed portion overlying and secured to the panel flanges and an outwardly disposed channel portion overlying and secured to the outer face of said top frame, the outer ends of the flanges of said channel portion being turned toward one another, and a drip gutter having a web received in the channel and secured in place by the turned ends of the flanges of the latter.

In testimony whereof I affix my signature.

OTTO J. GROEHN.